(12) United States Patent
Paradise et al.

(10) Patent No.: US 7,810,777 B2
(45) Date of Patent: Oct. 12, 2010

(54) SUCTION DEVICE AND BASES FOR KITCHENWARE, SMALL APPLIANCES, AND OTHER APPLICATIONS

(75) Inventors: Charles S. Paradise, New York, NY (US); Louis F. Henry, Scarsdale, NY (US)

(73) Assignee: Lifetime Brands, Inc., Garden City, NY (US)

( * ) Notice: Subject to any disclaimer, the term of this patent is extended or adjusted under 35 U.S.C. 154(b) by 1412 days.

(21) Appl. No.: 11/241,332

(22) Filed: Sep. 30, 2005

(65) Prior Publication Data

US 2006/0284043 A1    Dec. 21, 2006

Related U.S. Application Data

(63) Continuation-in-part of application No. 29/232,222, filed on Jun. 16, 2005, now abandoned, and a continuation-in-part of application No. 29/232,229, filed on Jun. 16, 2005, and a continuation-in-part of application No. 29/232,215, filed on Jun. 16, 2005, and a continuation-in-part of application No. 29/232,220, filed on Jun. 16, 2005, and a continuation-in-part of application No. 29/232,225, filed on Jun. 16, 2005, and a continuation-in-part of application No. 29/232,321, filed on Jun. 16, 2005, and a continuation-in-part of application No. 29/232,217, filed on Jun. 16, 2005, and a continuation-in-part of application No. 29/232,271, filed on Jun. 16, 2005, and a continuation-in-part of application No. 29/232,218, filed on Jun. 16, 2005, and a continuation-in-part of application No. 29/232,248, filed on Jun. 16, 2005, and a continuation-in-part of application No. 29/232,226, filed on Jun. 16, 2005, and a continuation-in-part of application No. 29/232,228, filed on Jun. 16, 2005.

(51) Int. Cl.
  *A45D 42/14*    (2006.01)
(52) U.S. Cl. .................. 248/362; 248/205.5; 248/206.2
(58) Field of Classification Search ................. 248/362, 248/205.5, 205.8, 206.2, 205.6, 363
See application file for complete search history.

(56) References Cited

U.S. PATENT DOCUMENTS 1,840,400 A    1/1932    Lebherz (Continued)

FOREIGN PATENT DOCUMENTS

DE    9017381 U1    3/1991

(Continued)

OTHER PUBLICATIONS

Partial International Search for PCT/US2006/023092, by Bernard Corneglio, Nov. 14, 2006.

*Primary Examiner*—Anita M King
(74) *Attorney, Agent, or Firm*—Ryan A. Schneider, Esq.; Troutman Sanders LLP

(57) ABSTRACT

A suction device that may be configured and conformed to a multitude of different types of kitchenware, small appliances, and other devices. The suction device comprises a base, a handle, a pivot, a plate, and a suction pad. The suction pad is connected to the plate. Two bridge-like structures with sloped undersides extend from the plate. The handle extends from the underside of one of the bridge-like structures, through the pivot, to the underside of the second bridge-like structure, and out through an elongated slot in the base. The handle is in sliding contact with the sloped undersides of the bridge-like structures.

12 Claims, 17 Drawing Sheets

U.S. PATENT DOCUMENTS

| | | | |
|---|---|---|---|
| 1,871,113 A | | 8/1932 | Compter et al. |
| 2,089,714 A | | 8/1937 | Schuler |
| 2,542,101 A | | 2/1951 | Suben |
| 2,871,053 A | | 1/1959 | Richter |
| 2,940,713 A | | 6/1960 | Van Dusen |
| 3,159,370 A | * | 12/1964 | Rubinstein ............. 248/346.01 |
| 3,747,170 A | | 7/1973 | Kieves |
| 3,765,638 A | | 10/1973 | Harrison |
| 3,863,568 A | | 2/1975 | Frederick |
| 4,012,007 A | | 3/1977 | Cunningham |
| 4,022,412 A | | 5/1977 | Houlf |
| 4,093,165 A | | 6/1978 | Sussman |
| 4,180,229 A | * | 12/1979 | Schulein .................... 248/363 |
| 4,505,446 A | | 3/1985 | Roder |
| 4,560,216 A | | 12/1985 | Egawa |
| 4,756,497 A | | 7/1988 | Lan |
| 4,934,641 A | | 6/1990 | McElhaney |
| 4,987,827 A | | 1/1991 | Marquez |
| 5,029,786 A | | 7/1991 | Wu |
| 5,065,973 A | | 11/1991 | Wang |
| 5,076,527 A | | 12/1991 | Yung-Huei |
| 5,085,390 A | | 2/1992 | Murphy |
| 5,087,005 A | | 2/1992 | Holoff et al. |
| 5,104,077 A | | 4/1992 | Liu |
| 5,186,559 A | | 2/1993 | Fu |
| 5,366,129 A | | 11/1994 | Nakamura et al. |
| 5,381,990 A | | 1/1995 | Belokin et al. |
| 5,395,159 A | | 3/1995 | Pinto |
| 5,474,206 A | | 12/1995 | Herring, Sr. |
| 5,511,751 A | * | 4/1996 | Shen ....................... 248/205.8 |
| 5,845,885 A | | 12/1998 | Carnevali |
| 5,970,860 A | | 10/1999 | Yip |
| 5,992,806 A | | 11/1999 | Adams |
| 6,045,111 A | | 4/2000 | Hsieh |
| 6,193,197 B1 | | 2/2001 | Lian |
| 6,237,983 B1 | * | 5/2001 | Yang ........................ 296/95.1 |
| 6,308,923 B1 | | 10/2001 | Howard |
| 6,371,324 B1 | | 4/2002 | Torniainen et al. |
| 6,386,494 B1 | | 5/2002 | Huang |
| 6,405,973 B1 | | 6/2002 | Hollinger |
| 6,439,760 B1 | | 8/2002 | Langeloh et al. |
| 6,443,388 B1 | | 9/2002 | Hollinger |
| 6,478,271 B1 | | 11/2002 | Mulholland |
| 6,561,476 B2 | | 5/2003 | Carnevali |
| 6,596,374 B1 | | 7/2003 | Adjeleian |
| 6,604,646 B2 | | 8/2003 | Torniainen et al. |
| 6,619,604 B1 | | 9/2003 | Stillman |
| 6,666,420 B1 | | 12/2003 | Carnevali |
| 6,739,061 B1 | | 5/2004 | Montel |
| 6,776,368 B1 | | 8/2004 | Duncan et al. |
| 6,808,090 B2 | | 10/2004 | Pedersen |
| 6,932,306 B2 | | 8/2005 | Zou et al. |
| 7,481,388 B2 | * | 1/2009 | Palese ........................ 241/168 |
| 2006/0285428 A1 | * | 12/2006 | Paradise et al. ............. 366/130 |

FOREIGN PATENT DOCUMENTS

| | | |
|---|---|---|
| FR | 2347563 | 11/1977 |
| GB | 813265 | 5/1959 |
| GB | 906624 | 9/1962 |
| GB | 975271 | 11/1964 |
| GB | 1193899 | 6/1970 |
| JP | 5220042 | 8/1993 |

\* cited by examiner

SUCTION DEVICE AND BASES FOR KITCHENWARE, SMALL APPLIANCES, AND OTHER APPLICATIONS

RELATED APPLICATIONS

This application is a continuation-in-part of U.S. patent application Ser. No. 29/232,222, filed Jun. 16, 2005, now abandoned; U.S. patent application Ser. No. 29/232,229, filed Jun. 16, 2005; U.S. patent application Ser. No. 29/232,215, filed Jun. 16, 2005; U.S. patent application Ser. No. 29/232,220, filed Jun. 16, 2005; U.S. patent application Ser. No. 29/232,225, filed Jun. 16, 2005; U.S. patent application Ser. No. 29/232,321, filed Jun. 16, 2005; U.S. patent application Ser. No. 29/232,217, filed Jun. 16, 2005; U.S. patent application Ser. No. 29/232,271, filed Jun. 16, 2005; U.S. patent application Ser. No. 29/232,218, filed Jun. 16, 2005; U.S. patent application Ser. No. 29/232,248, filed Jun. 16, 2005; U.S. patent application Ser. No. 29/232,226, filed Jun. 16, 2005; and U.S. patent application Ser. No. 29/232,228, filed Jun. 16, 2005. The aforementioned applications are incorporated herein by reference.

FIELD OF INVENTION

The field of the invention is mechanical suction or suction cup devices for use on various implements. More specifically, the invention is a base unit and suction mechanism that can be use on kitchenware, small appliances, and other devices and implements that a user wishes to be anchored firmly on a countertop, work surface, wall, mirror, or other structure or product. The invention includes attachment assemblies for securing the base to the implement.

BACKGROUND OF INVENTION AND PRIOR ART

The use of kitchenware such as salad spinners, mixing bowls, slicers, towel holders, countertop corkscrews, child's bowls, graters, chopping boards, child's plates, and cutting boards frequently requires or makes it desirable to keep the tool or device firmly planted on a counter or work surface. The same is true of small appliances, tools, and a multitude of other devices.

For example, mixing bowls can be difficult to handle and may slide or spill contents if the ingredients being mixed are stiff or bulky or chunky, or if the user does not maintain a sufficient grip on the bowl. Small children often throw their dishes off the table or highchair tray. Graters can slip and slide when food items are being grated, especially if the food is hard or sticky. Chopping boards are also subject to movement and slippage when items are being cut, sliced, or chopped, again, especially if the items being cut, sliced, or chopped are difficult to grip or cut. Corkscrews, of course, can be difficult to control if the cork is hard, or the bottle is slippery; if a stand corkscrew is used, the stand can slip and slide on the counter. Towel holders, too, will slip or tip if a towel hangs up during the unrolling of the towels or if the towel is inadvertently pulled too hard or quickly or if an individual towel section is difficult to tear.

It is also useful and safer to be able to use two hands in the operation of kitchen implements and kitchenware. For example, it is at times safer to use both hands to mix food ingredients, especially when ingredients must be added while other ingredients are being mixed. The use of both hands avoids spills and uneven mixing. In the typical case, however, the use of both hands is difficult or impossible, because one hand must hold the mixing bowl, perhaps at an angle, while the other hand stirs, ultimately making it difficult to properly achieve the best or most efficient mixing of ingredients. The possibility of spill or accident with the mixing implements is also increased when one must mix and add or mix and hold all at the same time.

Similarly, it is difficult to feed a small child when one hand must be used to hold the dish on the counter or tray while the other assists in feeding and cleaning the child. And, of course, if the child forcefully moves the bowl, the feeder can lose control of both the food and the child in attempting to react to the movement and prevent the spill. The disadvantages of not being able to use both hands in cutting and chopping operations are apparent. If one applies one hand to the food being cut or chopped and the other hand is applied to the knife, the cutting board is susceptible to movement and slippage, which can cause a spill and allow the food or chopping board to fall on the person of the operator. Applying one hand to the cutting or chopping board and the other to the knife or other implement leaves the food itself free to move about and increases the risk that the user of the knife will inadvertently cause the knife to slip and cut the user.

The same sort of difficulties occur to one degree or another in the use of all types of kitchenware, including corkscrews, salad spinners, graters, and slicers. Specifically, it is very difficult to simultaneously control the kitchenware, the food (or bottle) being acted upon, and other implements that are being used in the mixing, opening, cutting, slicing, or grating process. There is also a problem in simultaneously adding ingredients, getting other implements that may be promptly needed, and protecting from spills, slippage, and other accidents.

Moreover, few items of kitchenware or kitchen implements have means to safely, securely, and easily secure them to a work surface, or secure them to different locations on the surface or counter to accommodate the nature of the operation, the availability of counter space, or the convenience of the user.

There have in the past been attempts to assist the user in connection with the difficult operations described above. In the case of mixing bowls, for example, Tardiff U.S. Pat. No. 5,423,452 shows gripping treads or lugs on the bottom of the bowl. Morris U.S. Pat. Nos. 5,634,617 and 5,813,638, show the use of a stand for the bowl. Lauer et al U.S. Pat. No. 6,688,485 shows a bowl tilted in a base. Tieffel et al. U.S. Pat. No. D364,546 shows a bowl stand with attachers at the top of the stand, and Heiberg et al, U.S. Pat. No. 5,169,023 shows spaced ribs on the side of the bowl.

Individual suction cups have been placed on racks or the bottoms of some bowls or dishes to make them stick to a surface, see, e.g., Taylor U.S. Pat. No. 4,908,066 (suction cup attached to a holder fixedly attached to a tray) and Connery U.S. Pat. No. 6,484,989 (suction cups attached to a strip or rack in turn attached to a tray); however, such suction devices are difficult to install, must be applied with hand, pressure, and are subject to damage or deterioration when they are stored with other objects that can distort them and cause them to lose their ability to create a satisfactory partial vacuum. Many such suction devices also require some sort of permanent installation on the work surface, and many of them are very unattractive. Moreover, such suction devices are generally made specially to fit the size or intended location of the implements and are not generally easy to use with other kitchenware items.

As to other kitchenware and appliances, a variety of different suction device actuation arrangements have been used in the past. For, example, a rotating shaft with a bent or offset portion have been used in U.S. Pat. Nos. 1,840,400, 2,089,714, 3,765,638, 4,934,641, and 6,386,494.

Threaded engagements for suction cups are shown in U.S. Pat. Nos. 1,871,113, 2,542,101, 2,940,713, 5,104,077, 5,381,990, 6,045,111, 6,193,197, 6,478,271, 813,265, 906,624, and 975,271, as well as in Japanese Patent No. 5,220,042. Twist cams, compression plungers, and cam levers on shafts are shown in U.S. Pat. Nos. 3,863,568, 5,087,005, 5,366,129, 5,395,159, 5,970,860, and 6,666,420.

Suction cups that are simply pressed onto a surface have been used in a host of devices as shown by U.S. Pat. Nos. 4,022,412, 4,093,165, 4,987,827, 5,029,786, 5,076,527, 5,085,390, 5,186,559, 5,297,750, 5,474,206, 5,992,806, 6,405,973, 6,439,760, 6,443,388, 6,596,374, 6,619,604, and 6,739,061.

Additional suction cup activating devices include pins pulled outward activate a suction devices in U.S. Pat. No. 4,505,446; a rotating handle lifts central shaft in U.S. Pat. No. 2,871,053, and valves of various kinds in U.S. Pat. Nos. 4,560,216, 4,756,497, and 6,776,368. Spring biased shafts are shown in U.S. Pat. Nos. 1,193,899, 3,747,170, and 5,065,973. Levers that provide leverage on a suction device are shown in U.S. Pat. Nos. 6,308,923 and 6,808,090. A hooked rod serves as an actuator connector in U.S. Pat. No. 4,012,007. In U.S. Pat. No. 2,871,053 a rotating handle lifts a central shaft.

Some of these devices are not particularly reliable in operation. Many are unsightly, and many are bulky, having a relatively high profile. Also, many of such devices do not have an easy, sure-handed way to engage the suction device that is not also unsightly or problematic in terms to a firm, secure attachment.

Most of these prior art devices have actuation structure that extends some distance above the suction pad such that they are not compact and are difficult to use with kitchenware or other devices, because the addition of the suction device to and item of kitchenware or some other device renders the implement quite tall and difficult to store or use conveniently in a smaller space. Such height also makes the kitchenware item or other device difficult for a user to operate, because it can place the operative parts too high for comfortable use on a work surface.

On the other hand, suction cups that are pressed onto a work surface, although permitting a lower profile, more compact kitchenware item or implement, are generally not as durable or reliable, can become deformed while being stored, and are frequently very difficult to remove from work surfaces, especially if they have some moisture or sticky substance under them or are pressed too firmly on the work surface.

There may be occasions when a cook or user does not wish to use the suction device, wishes to have it disconnected from an item of kitchenware, or wishes to store the suction device separately from the kitchenware item or implement. On yet other occasions, the user may wish to have the suction device permanently attached to the kitchenware item at hand. Similarly, it is an advantage to have a suction unit that can be easily adapted to be used with or attached to types of kitchenware in addition to those described above.

Indeed, it would be useful to have a reliable suction device that could be easily connected to items other than kitchen items, such as radios, CD and DVD players, trays for medical use, boat accessories, tools and equipment for use out of doors, lamps, and a multitude of other items. In each case the suction device would provide an effective means to secure the object or implement to a surface and eliminate the need for a user to devote the use of a hand to secure and maintain the item securely in place while other operations are being performed. The suction device can also be used to anchor tools, appliances, and other devices to mirrors, workshop benches or tables, boats, carts, automobiles, pickups, airplanes, campers, and other locations where it is desirable to secure items against movement.

Yet another issue is that kitchenware items have not been provided with attractive and easily operable suction devices that can be optionally removed from the kitchenware item, quickly and securely attached to a work surface, or easily moved to another location and secured again to a surface. Present suction devices are also frequently attached to devices in such a manner that the items cannot be used without the suction device or cannot be stored separately from the kitchenware item. Detachment of suction devices can be difficult or require the use of tools such as screwdrivers, wrenches or pliers.

As noted above, many suction devices, especially those with an exposed suction cup or multiple exposed suction cups, are also very unattractive and do not blend in well with kitchen decor or other kitchenware items.

SUMMARY OF INVENTION

The present invention comprises a reliable suction device in a housing or base. The suction device can be reliably and very firmly secured to a work surface, or even another item of kitchenware. The housing or base itself can either be permanently attached to a variety of kitchenware items or removably attached to a variety of kitchenware items. The removable base or housing attachments are easy to operate and do not require the use of tools.

The suction device comprises a suction pad, a suction pad plate, a handle, and a pivot, all of which are housed in a base. The suction pad is larger than the plate. A central portion of the suction pad is connected to the suction pad plate such that an outer portion of the suction pad extends beyond the outer periphery of the suction pad plate and makes contact with the surface to which the suction pad is to be secured. Bridge-like structures extend away from the surface of the suction pad plate. Each bridge-like structure has a slanted or sloped underside. The handle extends from the underside of one bridge-like structure, though the pivot, along the underside of the second bridge-like structure, and out through an elongated horizontal slot in the side of the base, where it ends in a handle grip.

The handle is in sliding contact with the sloped or ramped underside of the bridge-like structures. When the handle is moved sideways or horizontally in one direction in the elongated slot in the side of the base, the handle slides along the sloped undersides of the bridge-like structures, causing the bridge-like structures, and, with them, the suction pad plate to move away from the surface to which the suction pad is to be secured. As the suction pad plate moves away from the surface, the plate pulls the central portion, but not the outer portion, of the suction pad away from the attaching surface and creates a partial vacuum between the central portion of the suction pad and the surface, causing the outer portion of the suction pad to adhere to the surface.

The base that houses the suction device is attached, removably, semi-permanently, or permanently, to items of kitchenware such as towel holders, chopping boards, mixing bowls, countertop corkscrews, children's dishes, graters, slicers, and salad spinners.

In the case of the removably attached suction devices, the housing or base is easily attached and detached via either a snap fit connection, an interlocking connection that snaps into place, an interlocking attachment that snaps in place, or a ramp and peg arrangement similar to threaded connections.

DETAILED DESCRIPTION

Certain terminology will be used in the following description. Words such as "top", "bottom", "upper", "lower", "upward", "downward", "rightward", "leftward", "above", "below", and the like, refer to those same directions in the properly oriented drawings. Words such as "inward", "outward", "inner", "outer", "central", refer to the same directions or locations at, toward, or away from the geometric center of the object shown or referenced in the properly oriented drawings. This use of such terminology is for convenient reference, is not intended to be limiting (as, for example, if an embodiment of the invention is inverted or reversed), and includes the words specifically mentioned, derivatives thereof, and words of a similar nature or import.

Suction Assembly

Figure 1:
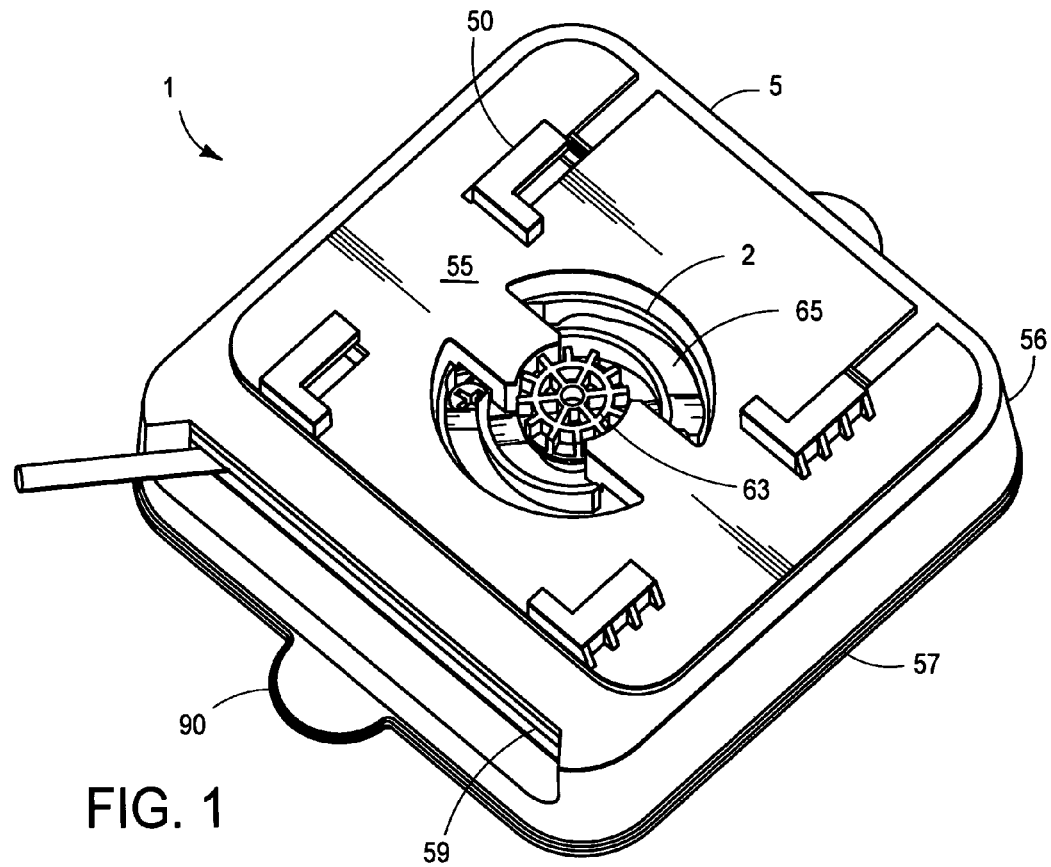
FIG. 1 is a perspective view of the invention showing a suction device housed in a base.
Figure 3:
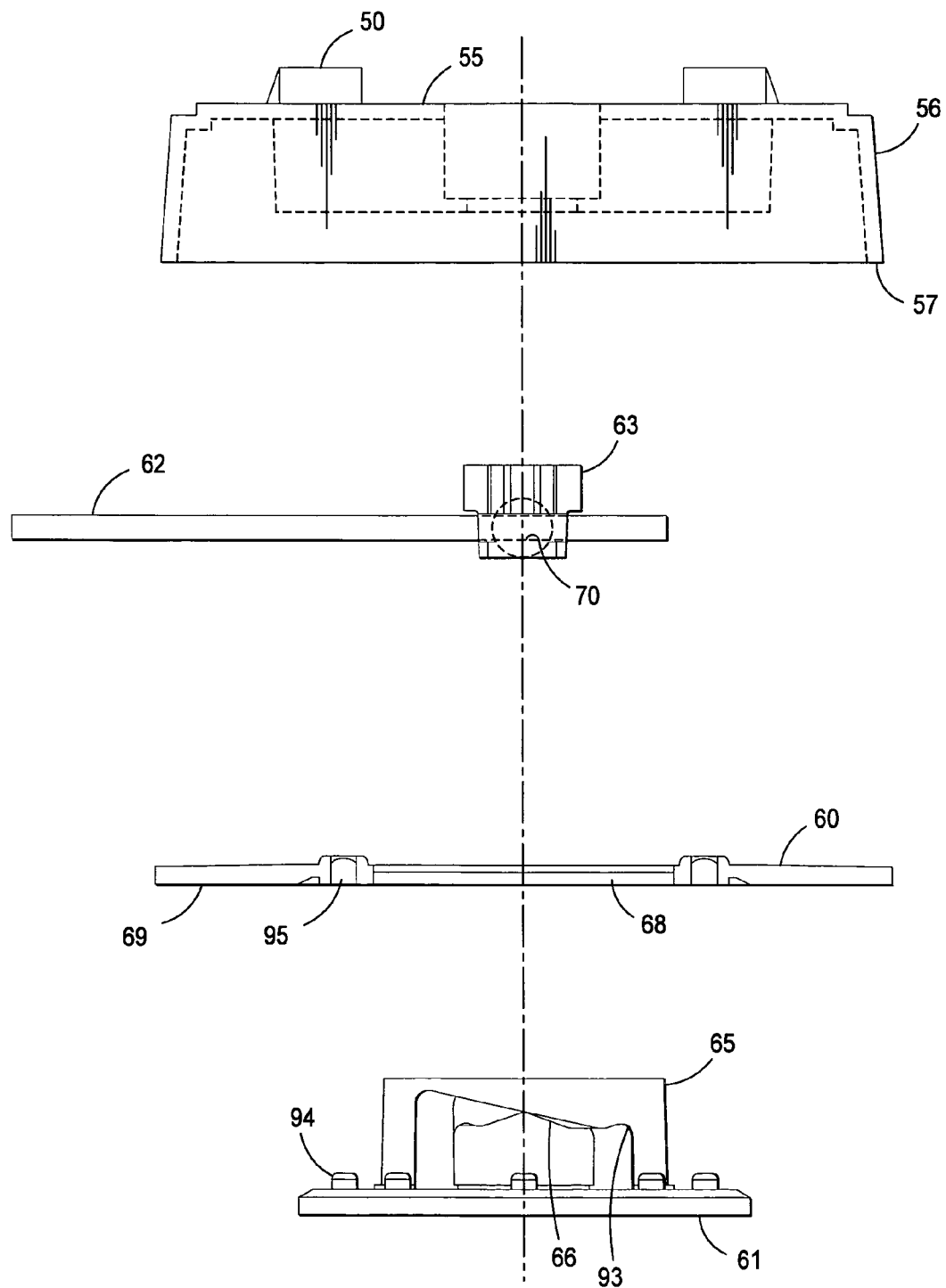
FIG. 3 is an exploded view of the base, handle, pivot, plate, and bridge-like components of the suction device of the invention.

As shown in FIGS. 1 and 3, a suction device assembly 1 comprises a suction device 2 and a base 5.

Base

Figure 2:
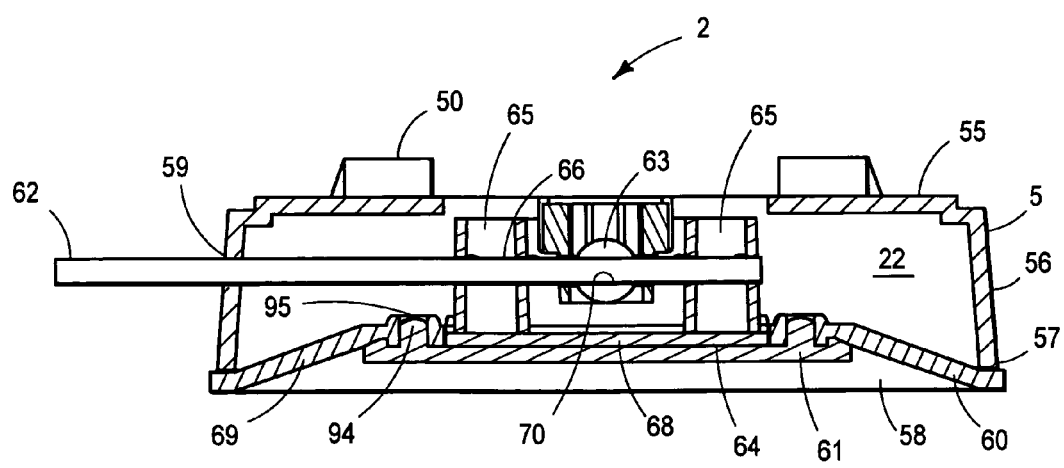
FIG. 2 is a cross sectional view of the suction device of the invention showing the handle, pivot, bridge-like structures, suction pad, and suction pad plate.

As can be best seen in FIG. 2, the base 5 forms an interior chamber 22 and has an attachment structure 50, a top 55, at least one side 56, and a bottom 57 forming an opening 58. An elongated horizontally oriented slot 59 is formed in the side 56 of the base 5.

The attachment structure 50, which is formed on or attached to the top 55 of the base 5, may be used to removably connect the base 5 to an item of kitchenware or some other implement or device. As will be described below, different types of attachment structures may be incorporated in or secured to the base 5 and used to connect the base 5 to items of kitchenware or other devices. And, as also described below, attachment structures may be incorporated in the sides of bases or items kitchenware. In some cases, the base 5 may integrally incorporated into the kitchenware item and be simply a lower portion of the kitchenware item.

Suction Device

The suction device 2 comprises a suction pad 60, a suction pad plate 61, a handle 62, and a pivot 63. The suction plate 61 has a top side 64. Two spaced-apart bridge-like structures 65 extend away and outward from the top side 64 of the plate 61. Each bridge-like structure 65 has an underside 66 that is ramped or sloped. The pivot 63 is situated between the bridge-like structures 65. Although the plate 61 is here shown as single structure, the plate could be made in two or more pieces that are attached to one another for use in the device 2.

The suction pad 60 is larger in diameter than the suction pad plate 61. The suction pad has a central portion 68 and an outer portion 69. When the suction pad 60 is placed on the top side 64 of the suction pad plate 61, the outer portion 69 of the suction pad 60 extends beyond and outward from the suction pad plate 61. The central portion 68 of the suction pad 60 is situated on and connected to the top side 64 of the plate 61. The suction pad 60 may also be overmolded onto or otherwise attached to the plate 61, or, if desired, glued to the top or bottom of the plate 61, effectively making the pad 60 and the plate 61 a single structure.

The handle 62 extends from the sloped underside 66 of one of the bridge-like structures 65, through a hole 70 in the pivot 63, along the sloped underside 66 of the other bridge-like structure 65, and outward thorough the elongated slot 59 in the side 56 of the base 5 above the bottom opening 58 of the base 5. The handle 62, so situated, is in sliding contact with the sloped undersides 66 of the bridge-like structures 65.

The suction device 2 is oriented so that the outer portion 69 of the suction pad 60, which extends outward from the plate 61, makes contact with the counter or work surface through the bottom opening 58 of the base 5.

Except for the suction pad 60, the various parts of the suction device 2 are made of a plastic, such as ABS (acrylonitrile-butadiene-styrene copolymer), or nylon. Plastic is preferred, not only because it is durable, but also because it can be easily molded to form the parts disclosed. However, other materials could be used for the various parts of the suction device 60, so long as they can be molded or constructed in the appropriate shapes and configurations. The suction pad 60 is made from natural rubber, silicone rubber, TPR (thermoplastic rubber), or a flexible plastic material such as PVC. The preferred embodiment of the suction device has a suction pad 60 made from natural rubber and other suction device 2 structures made from ABS.

Operation of Suction Device

Suction device 2 is operated by moving its handle 62 from one side of the elongated slot 59 to the other.

Movement of the handle 62 in one direction causes the handle 62 to slide along the sloped undersides 66 of the bridge-like structures 65. As the handle 62 slides along the slope undersides 66, it pulls the plate 61 from which the bridge-like structures 65 extend, in turn causing the plate 61 to pull the central portion 68 of the suction pad 60 away from the work surface or countertop, while the outer portion 69 of the suction pad 60 remains in contact with that surface. As the central portion 68 of the suction pad 60 is pulled away from the work surface, the air pressure between the suction pad 60 and the work surface decreases, creating a partial vacuum under the central portion 68 of the suction pad 60, which, in turn causes the outer portion 69 of the suction pad 60, which is still in contact with the work surface, to adhere to that surface.

When the suction device 2 is engaged, as described above, there is a force on the suction pad 60 caused by the partial vacuum that tends to pull the suction pad 60 toward the surface to which it is adhered. There is also a force generated by the stretching of the rubber (or other flexible) suction pad as it is pulled upward, urging the plate and suction pad toward the surface to which it is adhered. These forces are resisted by the handle 62, which holds the suction pad 60 (and the suction pad plate 61) in position via its contact with the bridge-like structures 65. (The resistance of the handle may be assisted by the inclusion of lock indentations described below.)

When the handle 62 is moved in the opposite direction (i.e., in a direction in the elongated slot 59 opposite from the direction described above to engage the suction device 2), the handle slides in the opposite direction along the sloped undersides 66 of the bridge-like structures 65, the suction pad 60 relaxes, and the suction plate 61 is allowed to move toward the surface to which it is adhered, which reduces the partial vacuum (increases the pressure between the suction pad 60 [and the plate 61, which is below a part of the pad 60] and the surface to which the suction device 2 is adhered). When the partial vacuum has been so reduced, the suction pad 60 is no longer adhered to the surface, and the suction device 2 can be easily removed from the surface to which it formerly secured.

Use of Kitchenware, Appliances, Tools, or Other Devices Having a Suction Device

An item of kitchenware (or appliance, tool, or other product or device) incorporating a suction device 7 is placed in a desirable location on a work surface or countertop (or a wall, mirror, or other surface). In this position, the outer portion 69 of the suction pad 60 is in contact with the work surface or counter. The handle 62 of the suction device 7 is moved in the elongated slot 59. As the handle 62 moves in the slot 59 the central portion 68 of the suction pad 60 is raised upward, creating a partial vacuum under the central portion 68 of the suction pad 60 while the outer portion of the 69 of the suction pad 60 remains on the work surface. The vacuum or suction so created under the central portion 68 of the suction pad causes the kitchenware device to stick or adhere to the counter or work surface in the desired location.

Of course, the kitchenware device will not be moved or tipped on the counter or work surface when some operation is performed by or in the kitchenware device, because the device is firmly secured to the counter by the suction device 2.

If it is desired to move kitchenware device to a different location, the handle 62 of the suction device 2 may be moved in the slot 59 in the side 56 of the base 5 to relieve the partial vacuum under the central portion 68 of the suction pad 60. The kitchenware item may then be moved to a different location on the counter or work surface, where it may again be adhered by suction in the manner stated above.

Base Embodiments and Attachments

The base 5 of the suction assembly 1 may be permanently attached to any kitchenware item, or the base 5 may be incorporated into the structure or mold of the kitchenware housing so that the kitchenware device is a unitary structure having a unitary housing that includes the kitchenware device with a base portion that houses the suction device 2. The permanent attachment or integral incorporation of the base 5 in the kitchenware item is the preferred embodiment for devices such as countertop corkscrews, because there is little need to remove the base from such devices.

Alternatively, the entire kitchenware device may be removably connected to the base 5 of the suction device 2.

Figure 7:
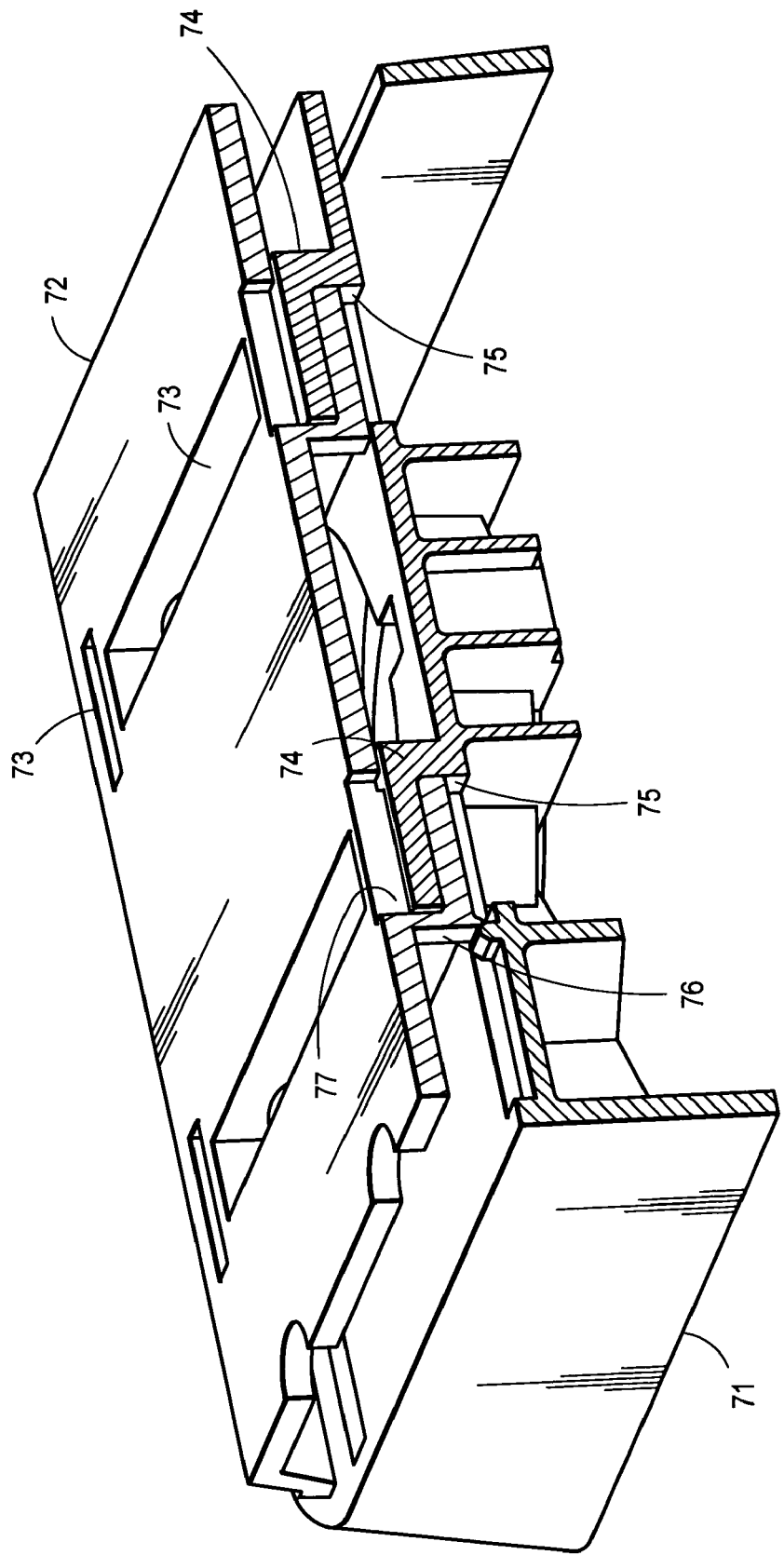
FIG. 7 is a perspective section view of a rectangular base of the invention, an attachment plate for an item of kitchenware, and an interlocking removable connection between the base and the attachment plate.

FIG. 7 shows a section through a base 71 of the type shown in FIG. 1 (but with suction device 2 omitted) and an attachment plate 72. The attachment plate 72 may be attached or secured to a kitchenware device by conventional screw, bolt, or other means via differently shaped attachment openings 73. Or the attachment plate 72 may be incorporated into and made a part of the bottom structure of the kitchenware device.

An extension 74 of the base 71 forms a slot 75, and an extension 76 of the plate 72 forms a slot 77. The extensions are formed so that one may interlock with the other, and, when they are so interlocked, secure the base 71 to the plate 72. Of course, when the plate 72 is attached to or incorporated into the kitchenware device, the plate and the kitchenware device are then both connected to the base 71.

The interlocking extensions 74 and 76 are easily engaged by aligning the extensions 74 and 76 and sliding one extension toward the other until the extensions 74 and 76 interlock, as shown in FIG. 7. So engaged, the base 71 and the plate 72 (together with any attached kitchenware device) are firmly connected. Movement of the extensions 74 and 76 in opposite directions will disengage the extensions 74 and 76 and, accordingly, disengage the base 71 from the plate 72 of the kitchenware item. Cooperating nubs (or projections) and recesses may be built into the extensions 74 and 76 so that the extensions 74 and 76 may be snapped or locked to place.

Figure 8:
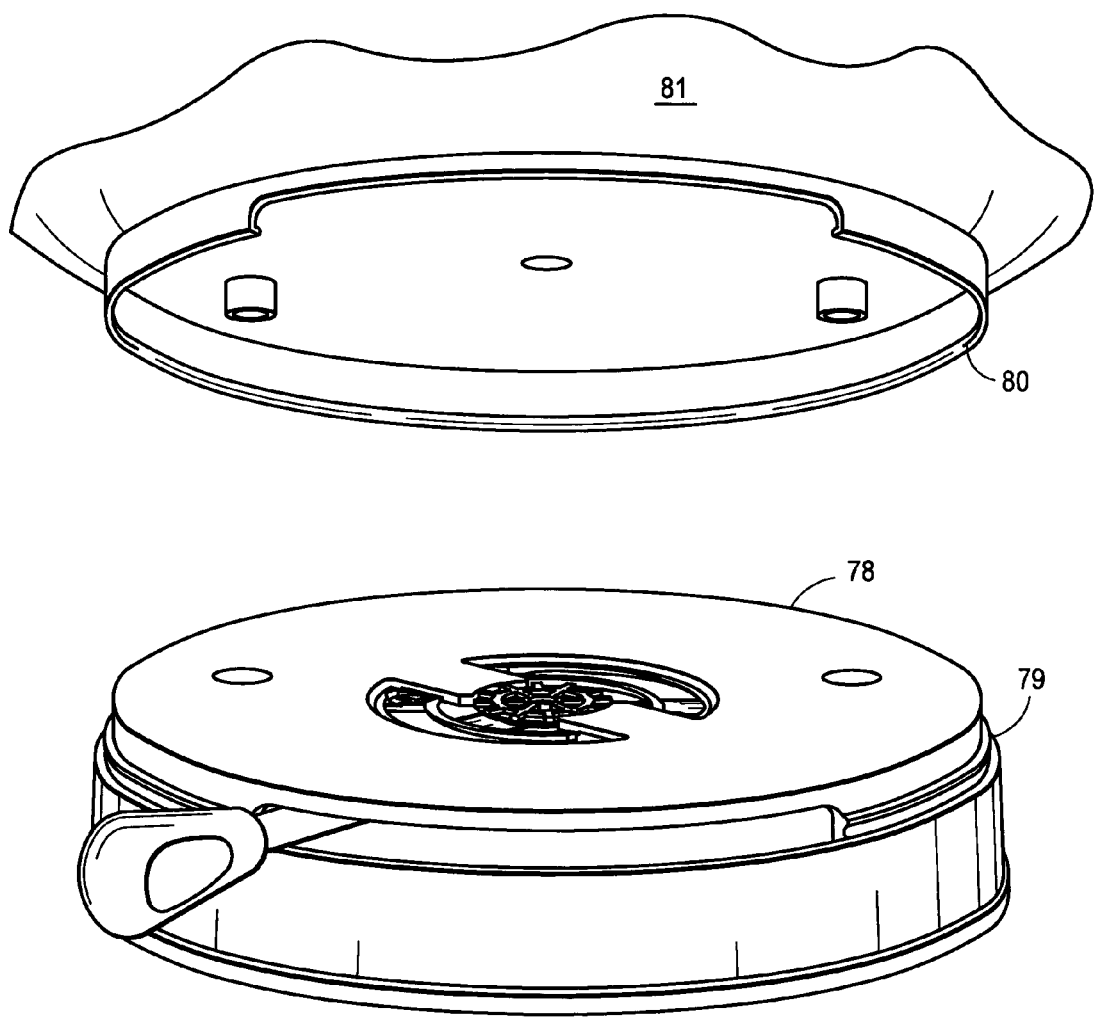
FIG. 8 is a perspective view of a circular base of the invention, the circular bottom of an item of kitchenware, and a snap-fit removable connection between the base and the bottom of the kitchenware.

FIG. 8 shows a circular base 78 containing a projection or rib 79 around the upper perimeter of the base 78 that is engaged by a matching slot or recess 80 formed in the bottom 81 of the kitchenware device. In this embodiment, the kitchenware device snaps onto the base 78 by placing the bottom 81 of the kitchenware device on top of the base 78 and pressing the kitchenware device downward until the projection 79 snaps into the recess 80.

Other types of removable and permanent base attachments are show in FIGS. 9, 13, 14, 18, and 19 and are described below. As will be appreciated from the description above and below, the attachment assemblies described here and below may be used, not only on kitchenware, but on all sorts of devices and implements that require attachment to a stand, base, or some other object or structure.

Pull Tab, Lock, and Suction Pad Seats

Sometimes the suction pads 60 remain very tightly secured or adhered to a counter or other work surface, even when the partial vacuum has been released. This may occur if the suction device 2 is pressed onto a surface in a forceful or fast manner such that some air is expelled from the under the pad 60 before the handle 62 is moved. Thus, it is convenient to have the suction pad 60 form a pull tab 90, as shown, for example, in FIGS. 1, 9, 10, and 17. If the suction pad 60 remains too tightly secured, the tab 90 may be pulled to release the suction pad 60.

In order to assure that the handle 62 remains firmly seated once it has been moved into the engaged (suction) position or into the disengaged (no suction) position in the elongated slot 59, the preferred embodiment of the suction device 2, contains at least one lock indentation 93 formed at the end of at least one of the sloped undersides 66 of the bridge-like structures 65, as shown in FIGS. 3-6. Thus, when the handle 62 reaches that end of the sloped underside 66, the handle will settle into the lock indentation 93 and tend to remain there until forcefully moved out of the indentation 93. The lock indentation 93 thus prevents the suction from being released by an incidental bumping of or other movement of the handle 62. In addition, the lock 93 prevents the suction plate 61 from moving of its own accord (due to the force of partial vacuum and the sliding of the handle 62 along the sloped undersides 66 of the bridge-like structures 65) toward the surface to which the suction pad 60 is secured and, consequently, releasing the partial vacuum.

Figure 4:
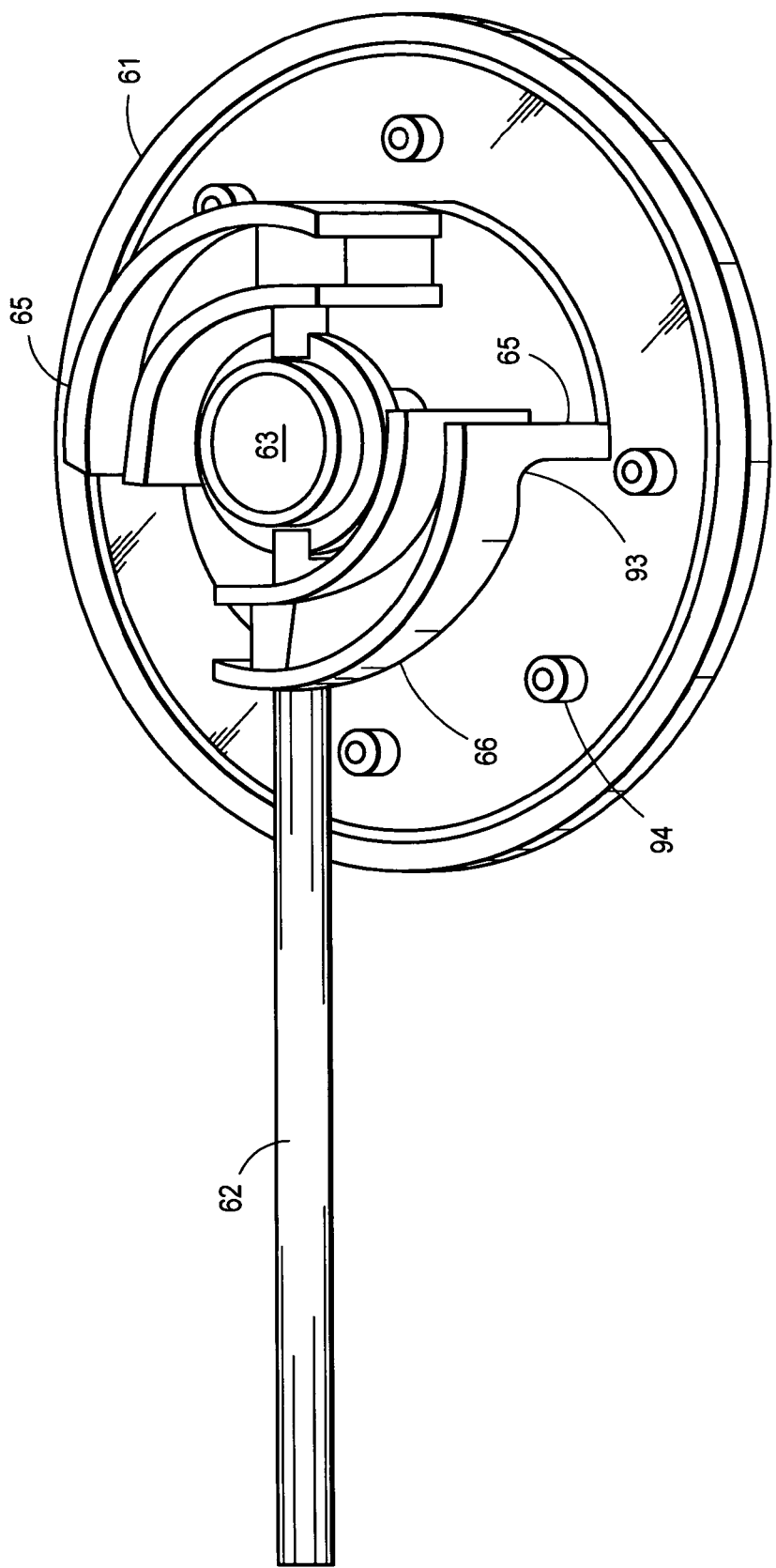
FIG. 4 is a perspective view the handle, suction pad plate, pivot, and handle of the invention.
Figure 5:
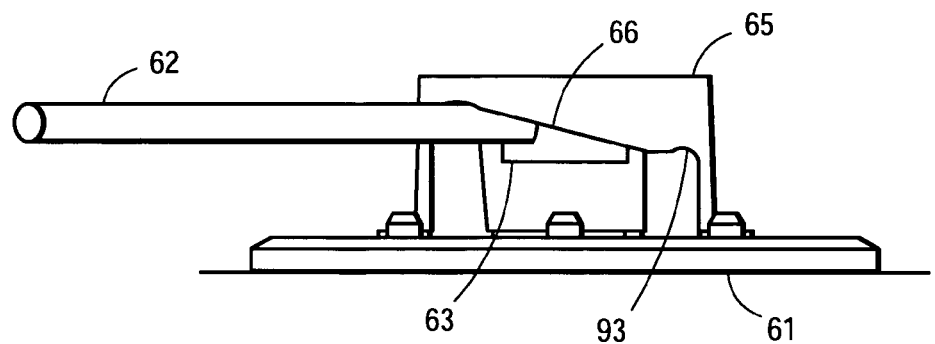
FIG. 5 is a side view of the handle, pivot, and bridge-like structures, and suction pad plate showing the plate on a surface.
Figure 6:
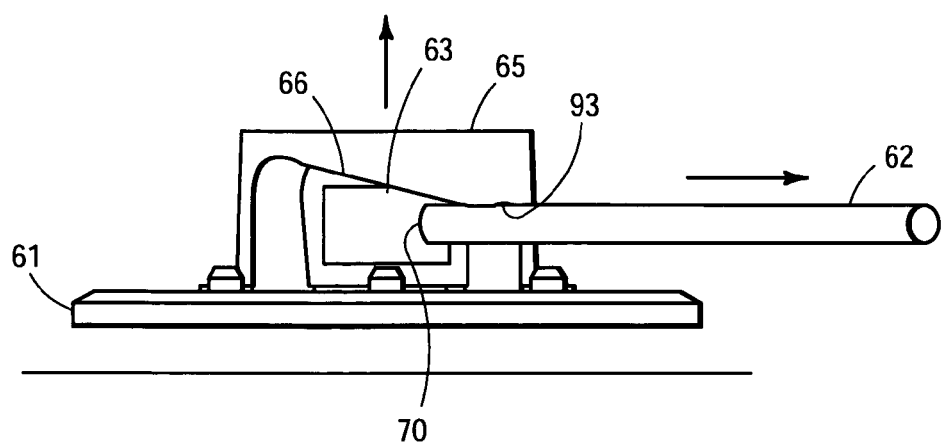
FIG. 6 is a side view of the handle, pivot, and bridge-like structures, and suction pad plate showing the suction pad plate pulled away from a surface.

In order to provide for a secure, non-slip mounting of the suction pad 60 on the suction pad plate 61, the preferred embodiment of the plate 61 forms suction pad seats 94, as shown in FIGS. 2, 3 and 4. The preferred embodiment of the suction pad 60 forms corresponding holes 95 that cooperate with the seats 94 so that the suction pad 60 may be placed on the suction pad plate 61 and secured or held thereon by the suction pad seats 94. The use of such seats 94 prevents the suction pad 60 from sliding when there is a partial vacuum between the suction pad plate 61 (and the central portion 68) and the surface to which the suction pad 60 is mated. The use of the seats 94 also prevents the suction pad 60 from slipping and sliding on the plate 61 during movement or other handling of the suction assembly 1 by a user.

Kitchenware Devices with Suction Devices

Figure 9:
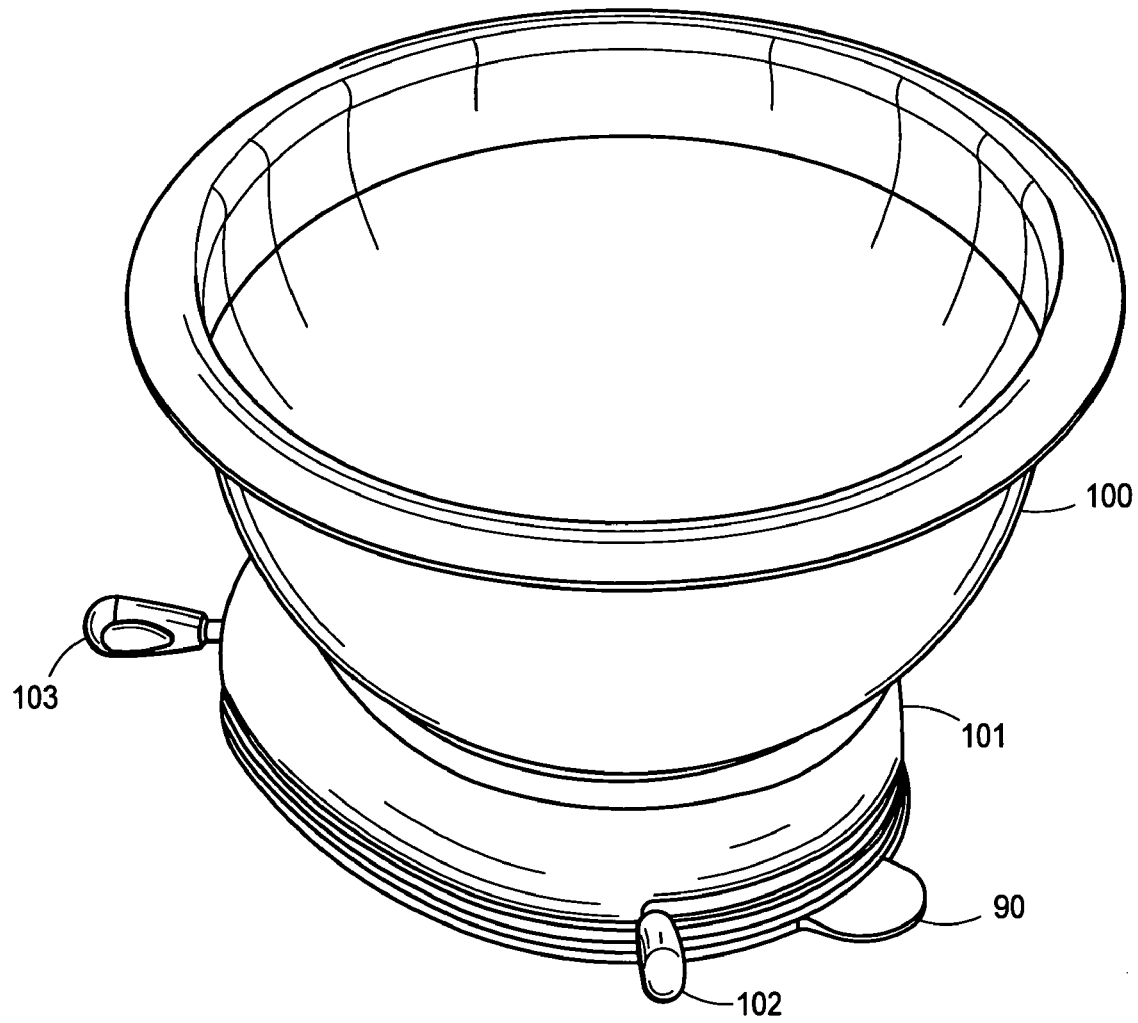
FIG. 9 is a perspective view of the suction device of the invention attached or connected to a mixing bowl and showing the handles of two suction devices, one for securing the base to a work surface and the other for securing the bowl to the base.

FIG. 9 shows a mixing bowl 100 and base 101. The base 101 contains two suction devices, as indicated by the extended handles 102 and 103. The suction device operated by handle 102 is constructed and operates as described above; it secures the mixing bowl assembly to the work surface. The suction device operated by handle 103 is again constructed and operates as described above, but it is inverted so that the suction device secures the bowl 100 to the base 101. The base 101 is custom-shaped to receive the bowl 100 and presents an attractive, sleek appearance. The base 101 is secured to a work surface so that it will not move or be disturbed during the mixing process. The mixing bowl 100 may be secured to the base at different angles. The mixing bowl 100 and base 101 may thus be secured in a way that prevents either or both from moving or becoming dislodged while the bowl 100 is being used and permits the user to use both hands for mixing and adding ingredients without having to hold and control either the base 101 or the bowl 100. In addition, the bowl 100 can be securely attached to the base 101 at a large variety of angles to accommodate the preferences of the user, as well as the necessary orientations of the bowl 100 for adding different types of ingredients and performing different types and speeds of mixing.

Figure 10:
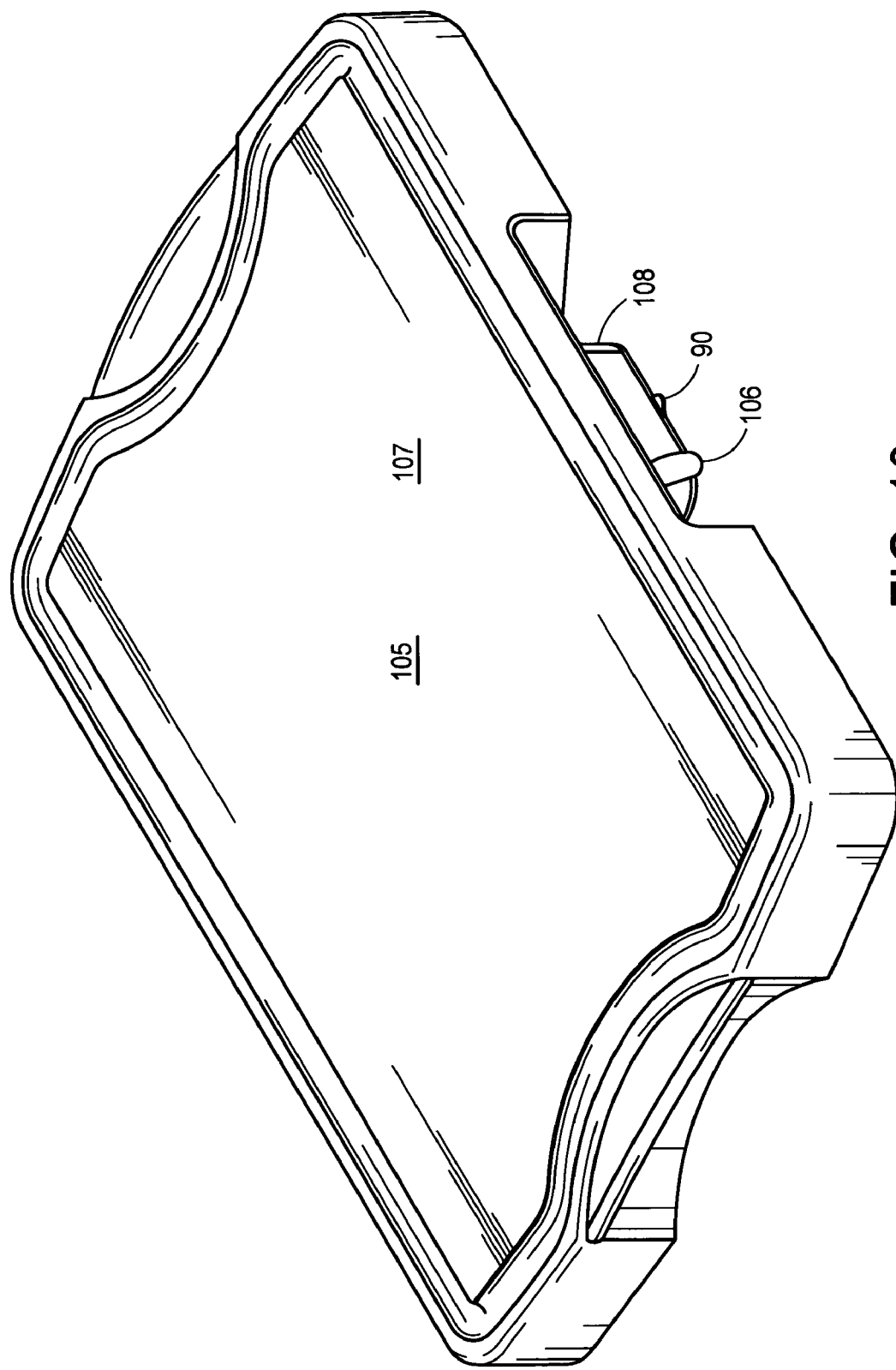
FIG. 10 is a perspective view of the suction device of the invention attached or connected to a chopping board.

FIG. 10 shows a chopping board 105, under which is a base 108 that contains a suction device constructed as describe above. The suction device is operated by handle 106. During a cutting or chopping operation on a top 107 of the chopping device 105, the chopping board 105 may be firmly secured to the counter or work surface by the suction device. The user may desire to use the chopping board 105 apart from the suction device, and, accordingly, the base 108 of the suction device is secured to a plate on the bottom of the cutting board 105 with a interlock connection as shown in FIG. 7. The chopping board 105 can be secured to the counter so the user is free to use both hands for the chopping or cutting operation without devoting either hand to the control and stabilization of the chopping board during the operation.

Figure 11:
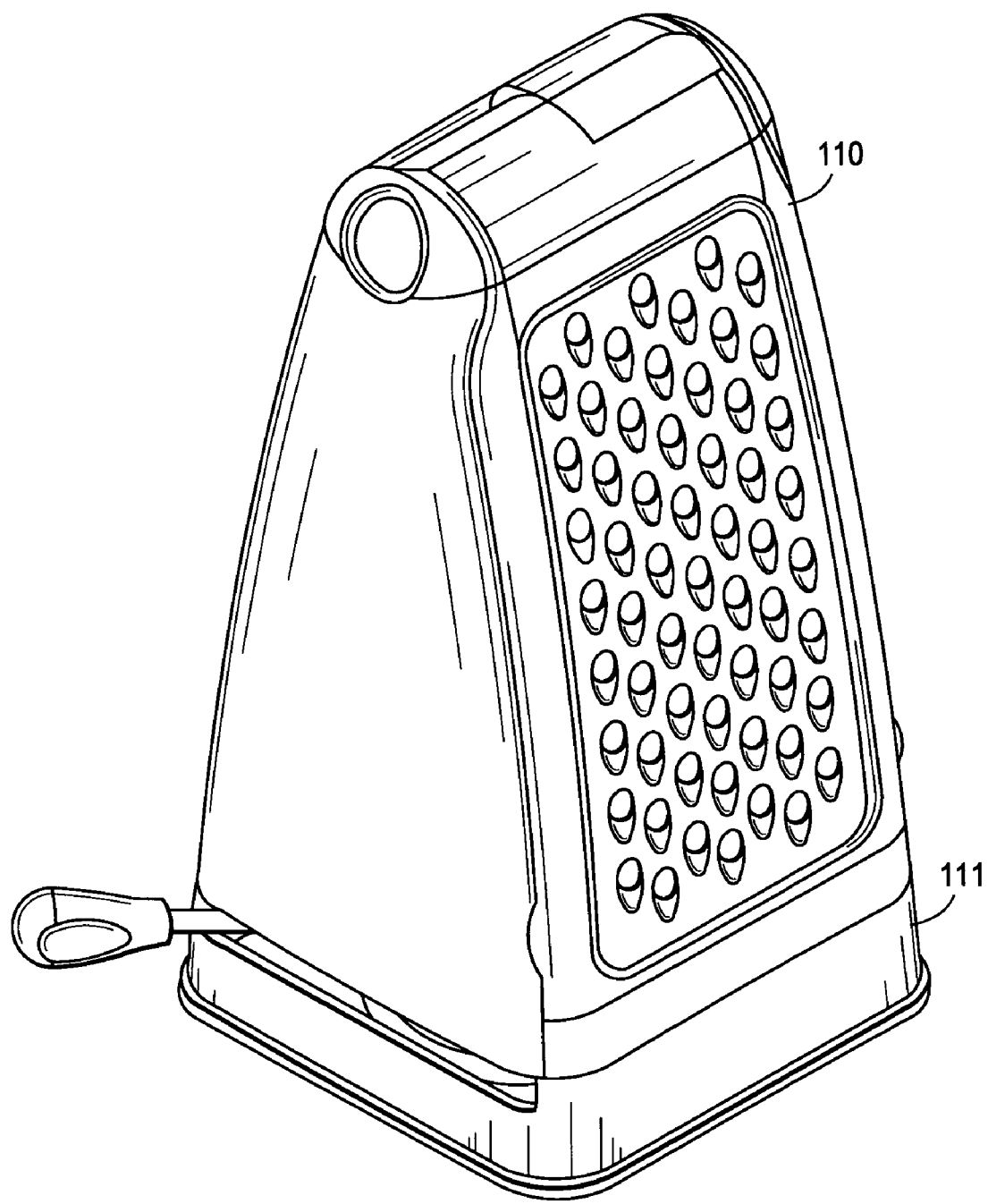
FIG. 11 is a perspective view of the suction device of the invention attached or connected to a grater.

FIG. 11 shows a cheese grater 110 connected to a base 111 housing a suction device that is constructed and operates in the same manner as described above. Here again, the user may desire to use the grater 110 apart from the suction device, and, accordingly, the base of the suction device is secured to a plate on the bottom of the grater 110 with an interlocking connection as shown in FIG. 7. The grater 110 may be secured to the counter so the user is free to use both hands for the grating operation without devoting either hand to the control and stabilization of the grater 110 during the operation.

Figure 12:
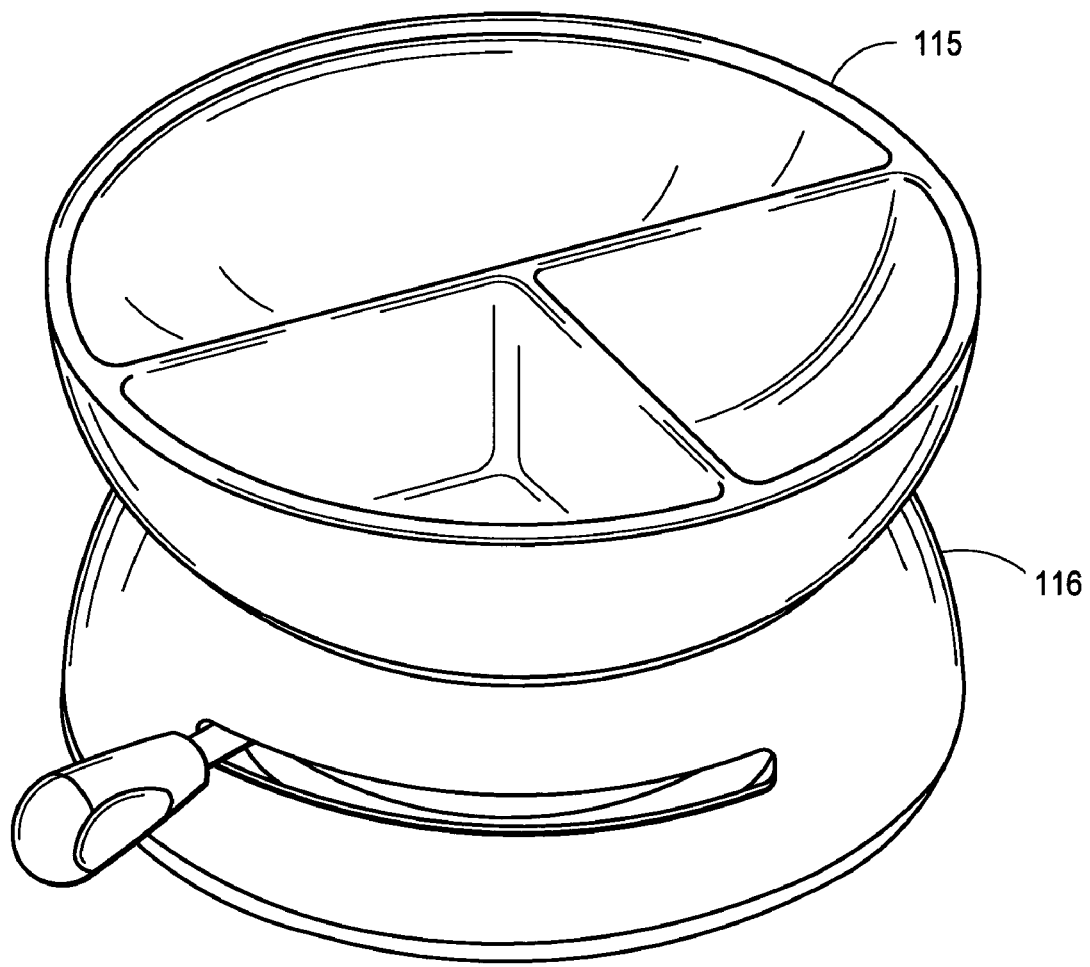
FIG. 12 is a perspective view of the suction device of the invention attached or connected to a child's dish.

FIG. 12 shows a child's dish 115 and incorporated base 116 housing a suction device that is constructed and operates in the same manner as described above. The base 116 is removable from the dish 115, which makes it easier to clean the child's dish 115 and base 116. (See, for example, the base attachment shown in FIG. 18.) The child's dish 115 may be secured to a table or high chair tray, thus preventing a small child from intentionally or accidentally knocking the dish 115 off the table or tray. When the dish 115 is so secured the person feeding or tending the child need not hold the dish 115 to prevent it from being knocked off the table or tray, but may, instead, use both hands to feed and clean the child.

Figure 13:
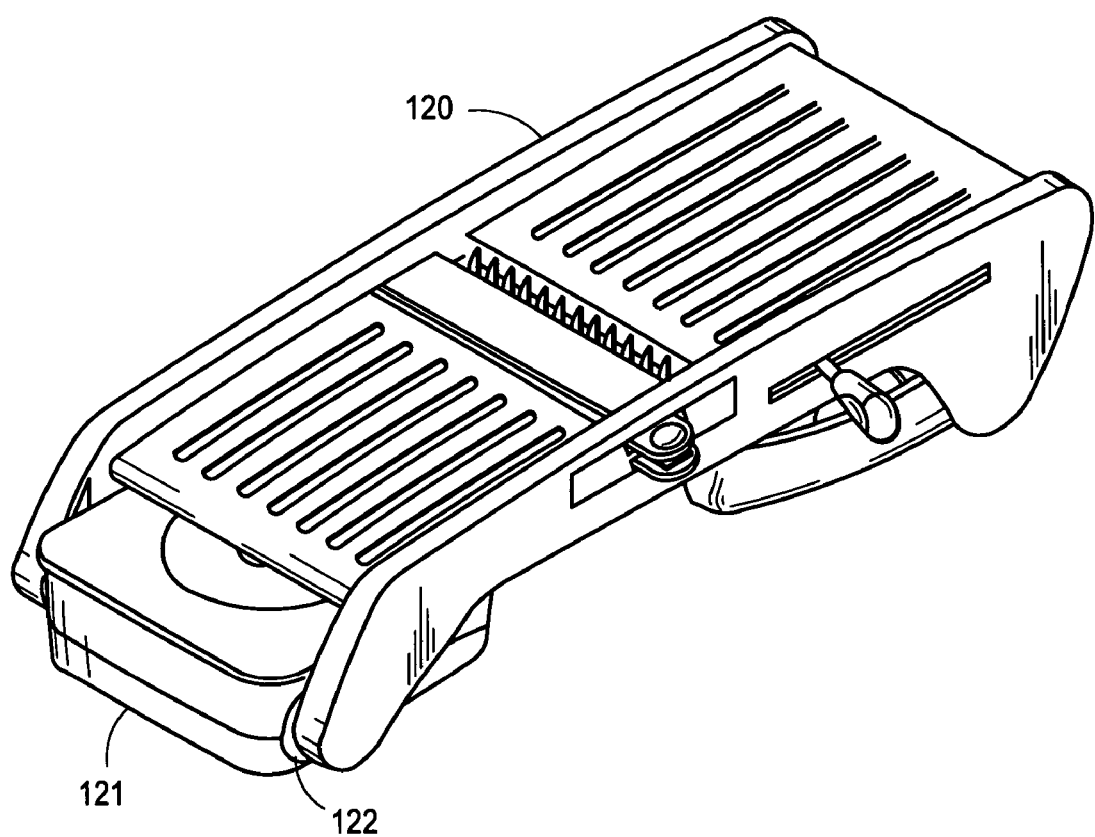
FIG. 13 is a perspective view of the suction device of the invention attached or connected to a mandoline-type slicer and showing a suction device attached to a front of the slicer, folded away for storage.
Figure 14:
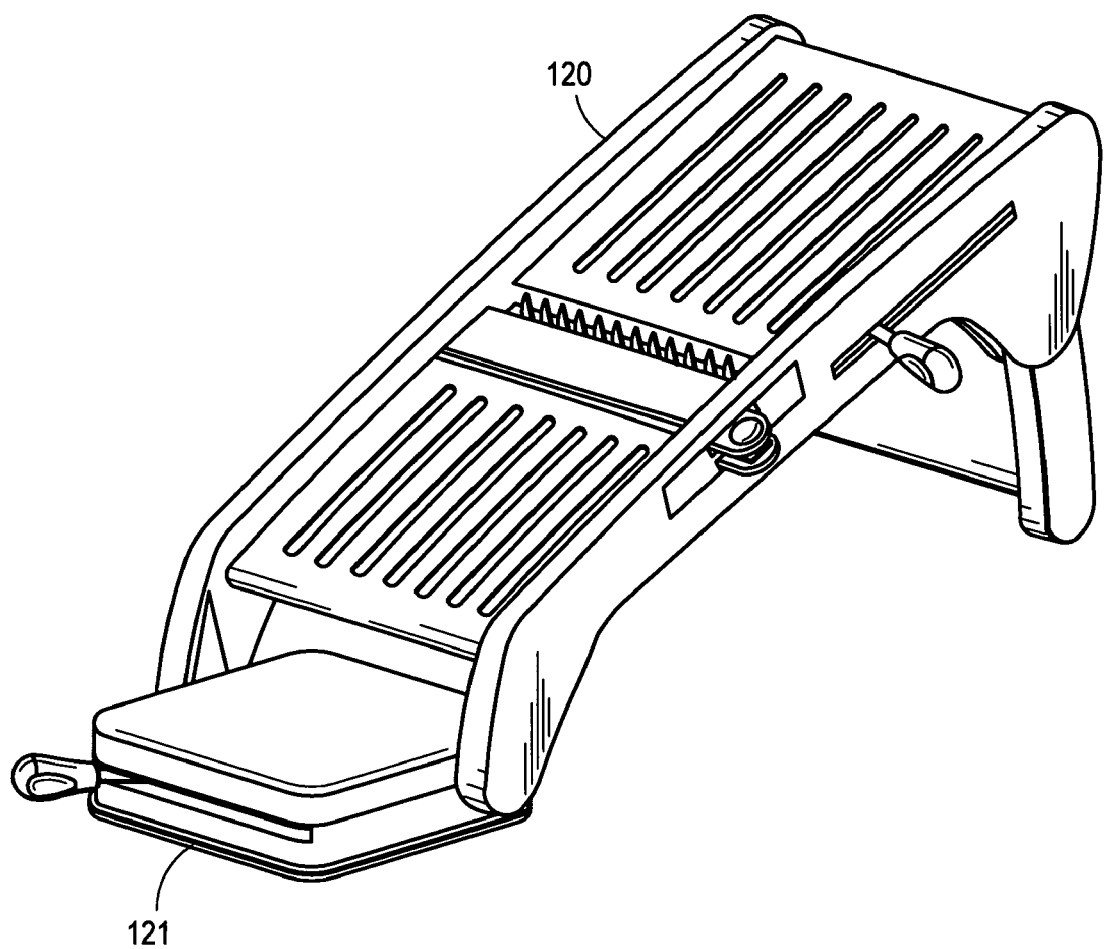
FIG. 14 is a perspective view of the suction device of the invention attached or connected to the slicer of FIG. 13, but with the front suction device extended outward of the front of the slicer for use.

FIGS. 13 and 14 show a mandoline-type slicer 120 with a suction device contained in a base 121 at the front of the slicer 120. As shown in FIG. 13, a preferred embodiment of the base 121 is connected by to the slicer 120 by an axle or axles 122 to permit it to be rotated under the slicer 120 for convenient storage, or, as shown in FIG. 14, may extended or rotated out from the front of the slicer 120 for use during the slicing operation. The suction device secures the front of the slicer 120 to the counter or work surface so the user may slice food on the slicer 120 without devoting a hand to controlling the slicer 120.

Figure 15:
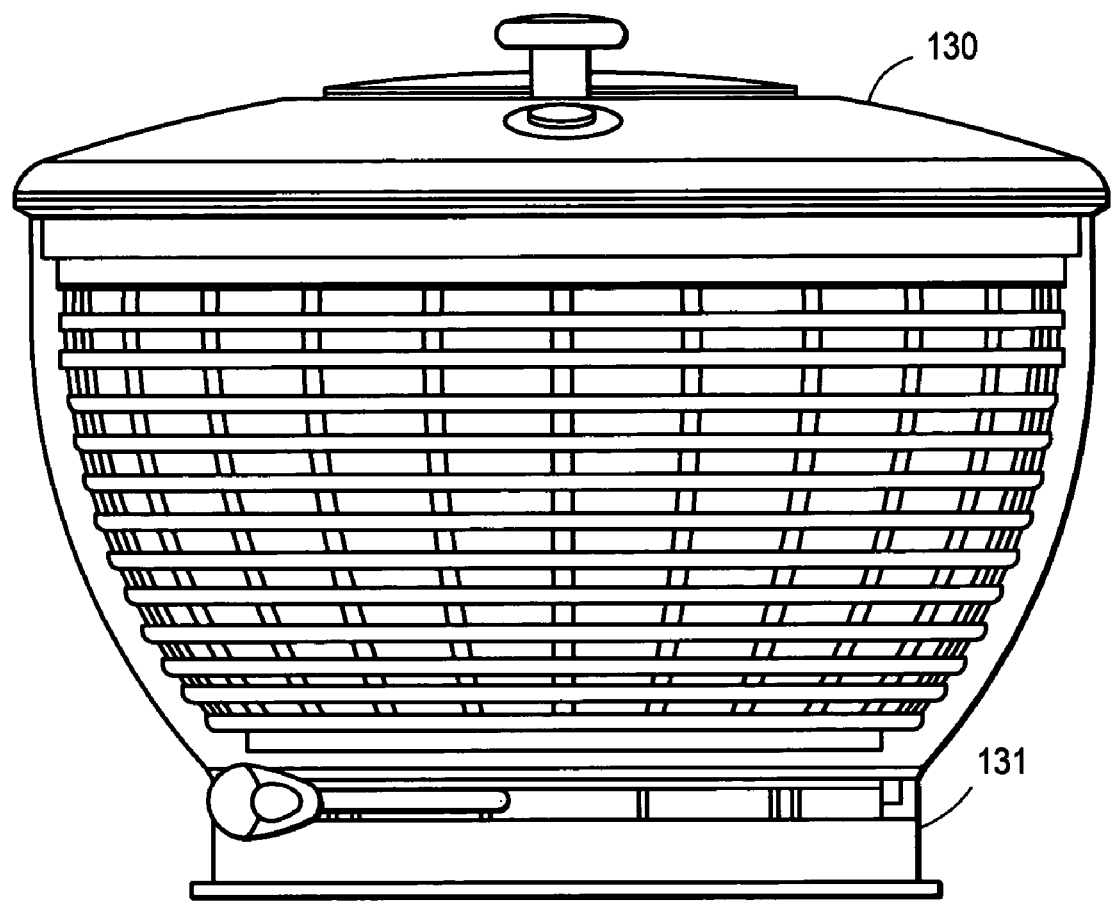
FIG. 15 is a perspective view of the suction device of the invention attached or connected to a salad spinner.
Figure 18:
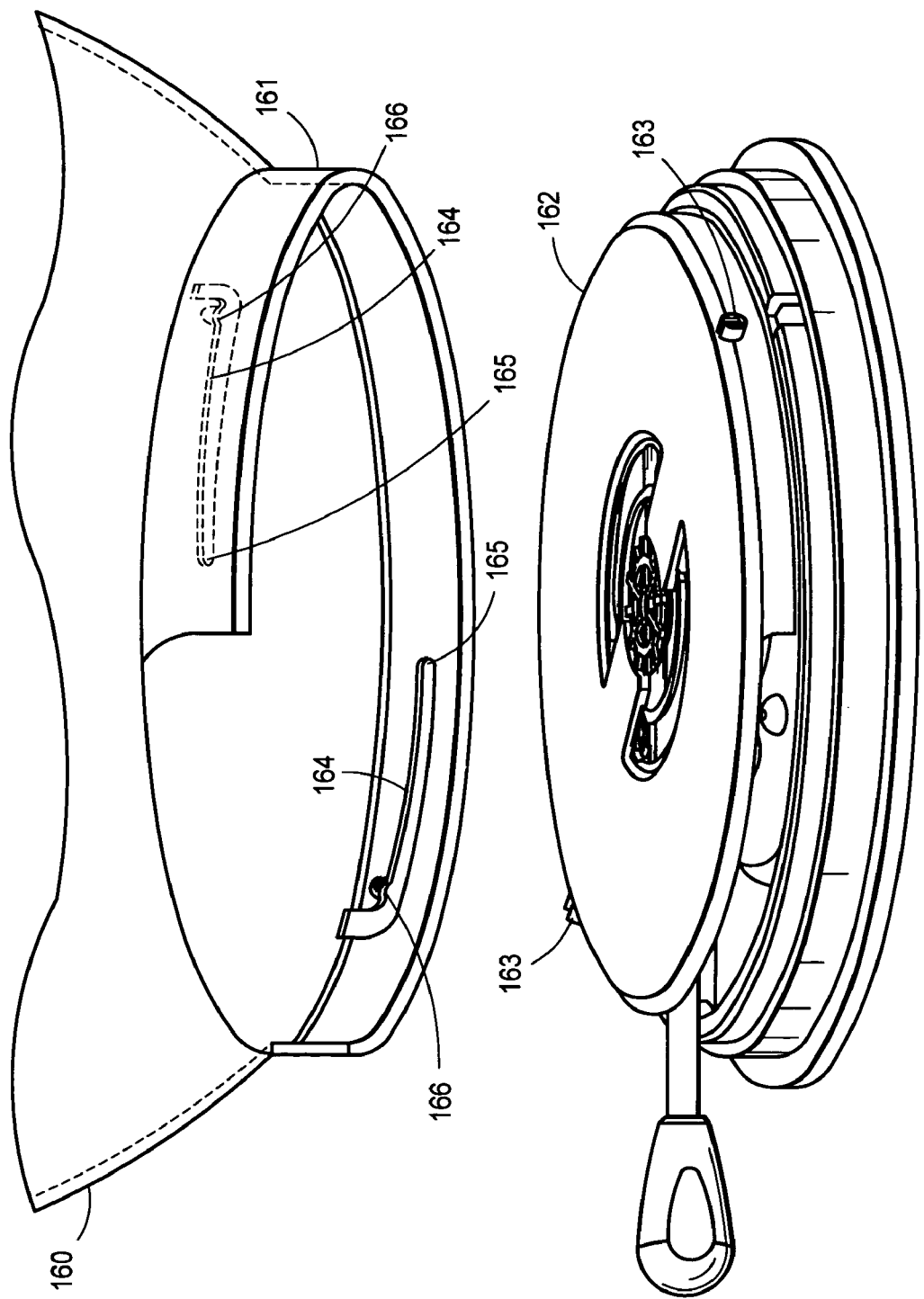
FIG. 18 is a perspective view of a bottom portion of a salad spinner showing a preferred structure for removably attaching or securing the salad spinner to a base containing a suction device.

FIG. 15 shows a salad spinner 130 attached to a base 131 containing a suction device that is constructed and operated as described above. The suction device permits the salad spinner 130 to be securely attached to a counter or work surface while it is spinning so that is will not move around on the counter or spill its contents. So attached, the user need not control the salad spinner 130 with either hand and may tend other tasks related or unrelated to the operation of the spinner 130. The base 131 is attached to the salad spinner via the connection as shown in FIG. 18, below.

Figure 16:
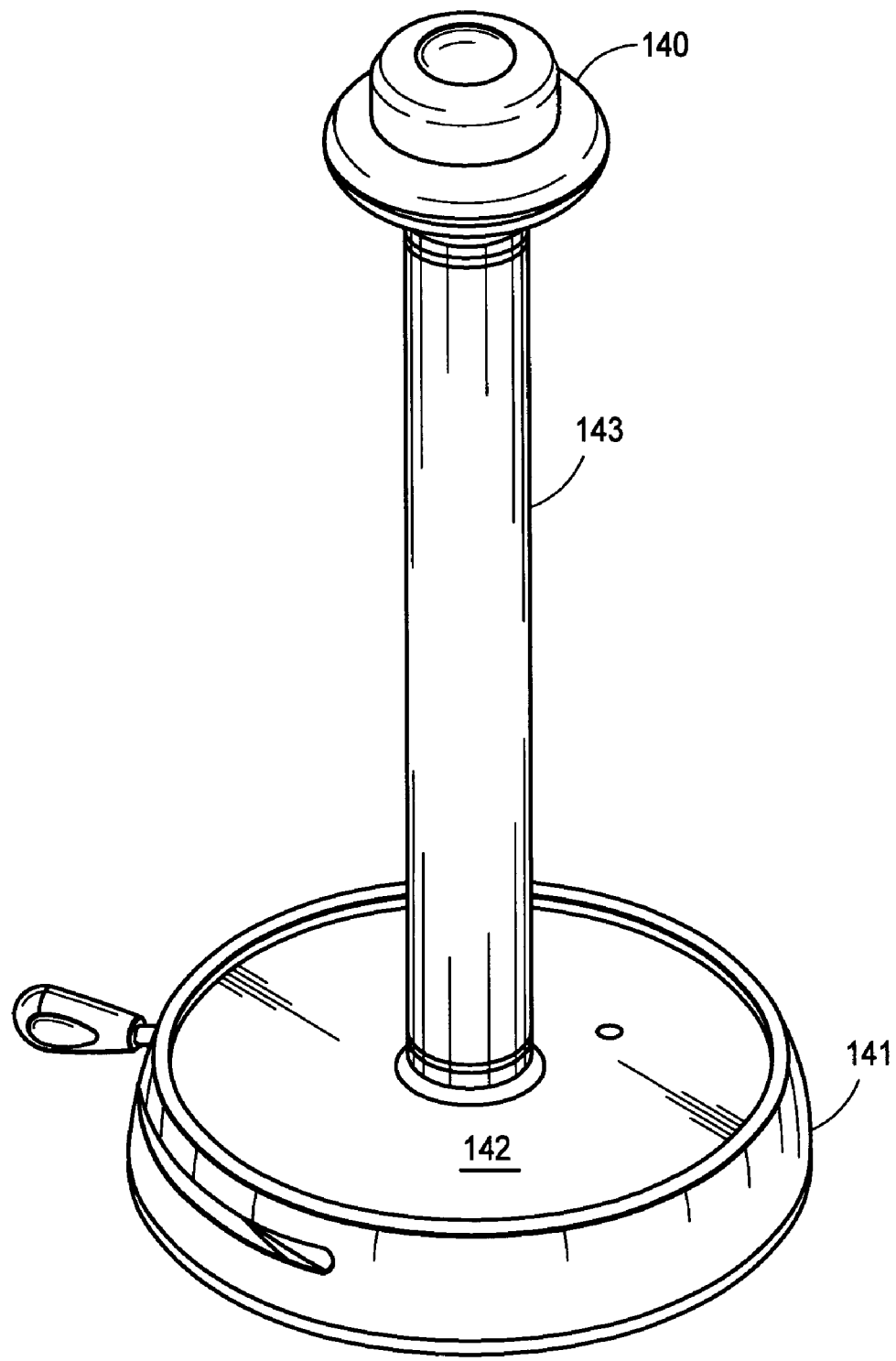
FIG. 16 is a perspective view of the suction device of the invention attached or connected to a towel holder.

FIG. 16 shows a towel holder 140 connected to a base 141 containing a suction device that is constructed and operated as described above. In this case, the towel holder 140 is mounted to a top 142 of the base 141 by either a permanent or semi-permanent connection. Alternatively, a tube 143 of the towel holder 140 may be screwed into the top 142 of the base via cooperating threaded connections in the top 142 of the base 141 and the tube 143. In addition, the tube 143 may be installed over a plastic inner tube that may be threaded into the top 142 of the base 141. The use of the suction device permits the towel holder to be firmly secured to the counter while towels are being unrolled, thus preventing the towel holder from moving or tipping if a towel is pulled to vigorously or does not easily separate from a roll of towels.

Figure 17:
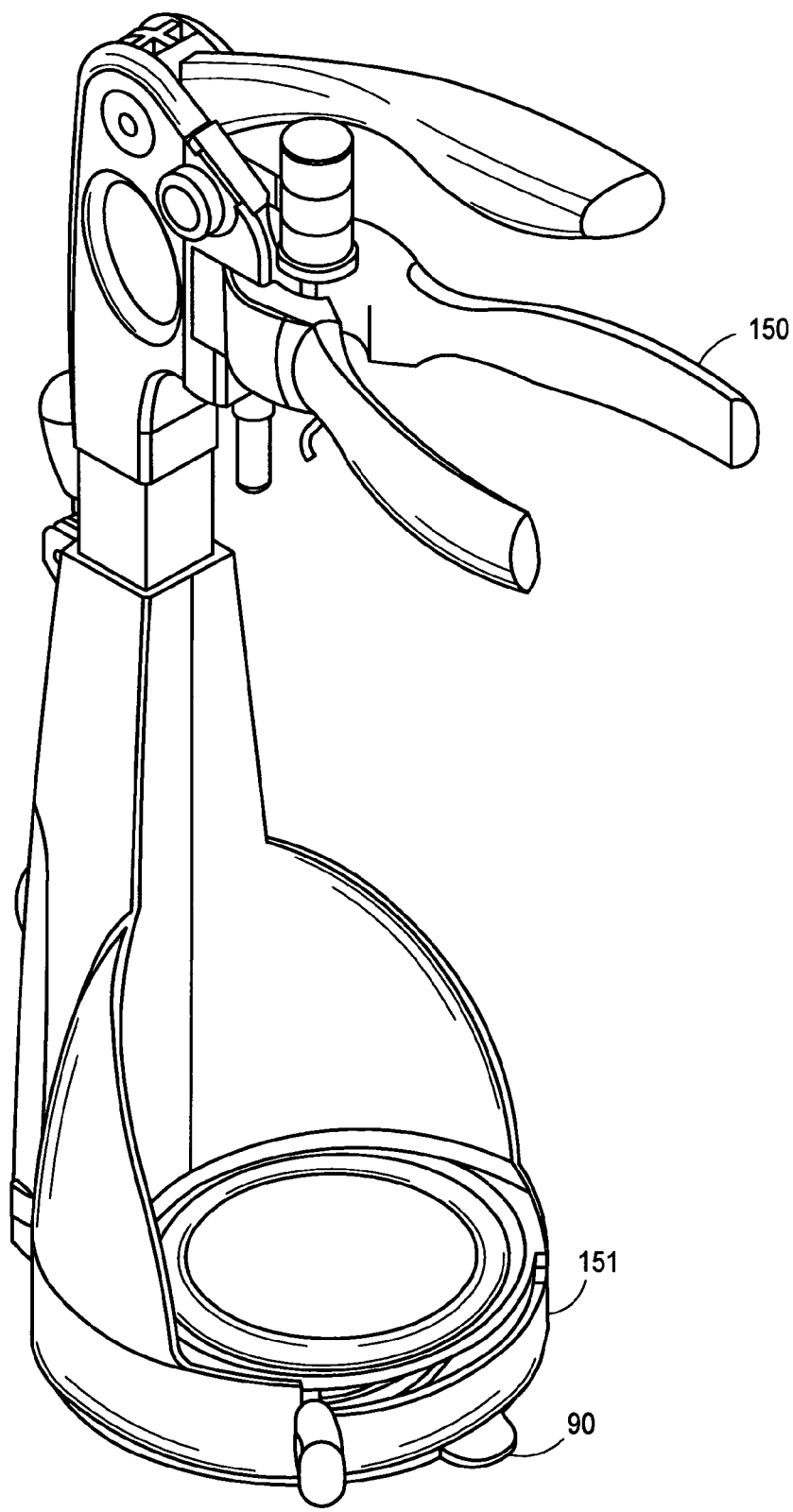
FIG. 17 is a perspective view of the suction device of the invention incorporated in the base of a tabletop corkscrew.

FIG. 17 shows a tabletop corkscrew 150 connected to a base 151 containing a suction device that is constructed and operated as described above. In a preferred embodiment, the corkscrew is mounted to the base 151 by either a permanent or semi-permanent connection. The use of the suction device permits the corkscrew 150 to be secured to the counter while the corkscrew 150 is being used to remove a cork from a bottle, thus preventing the corkscrew 150 from moving or tipping during the removal of the cork.

Additional Base Embodiments and Attachments

Figure 19:
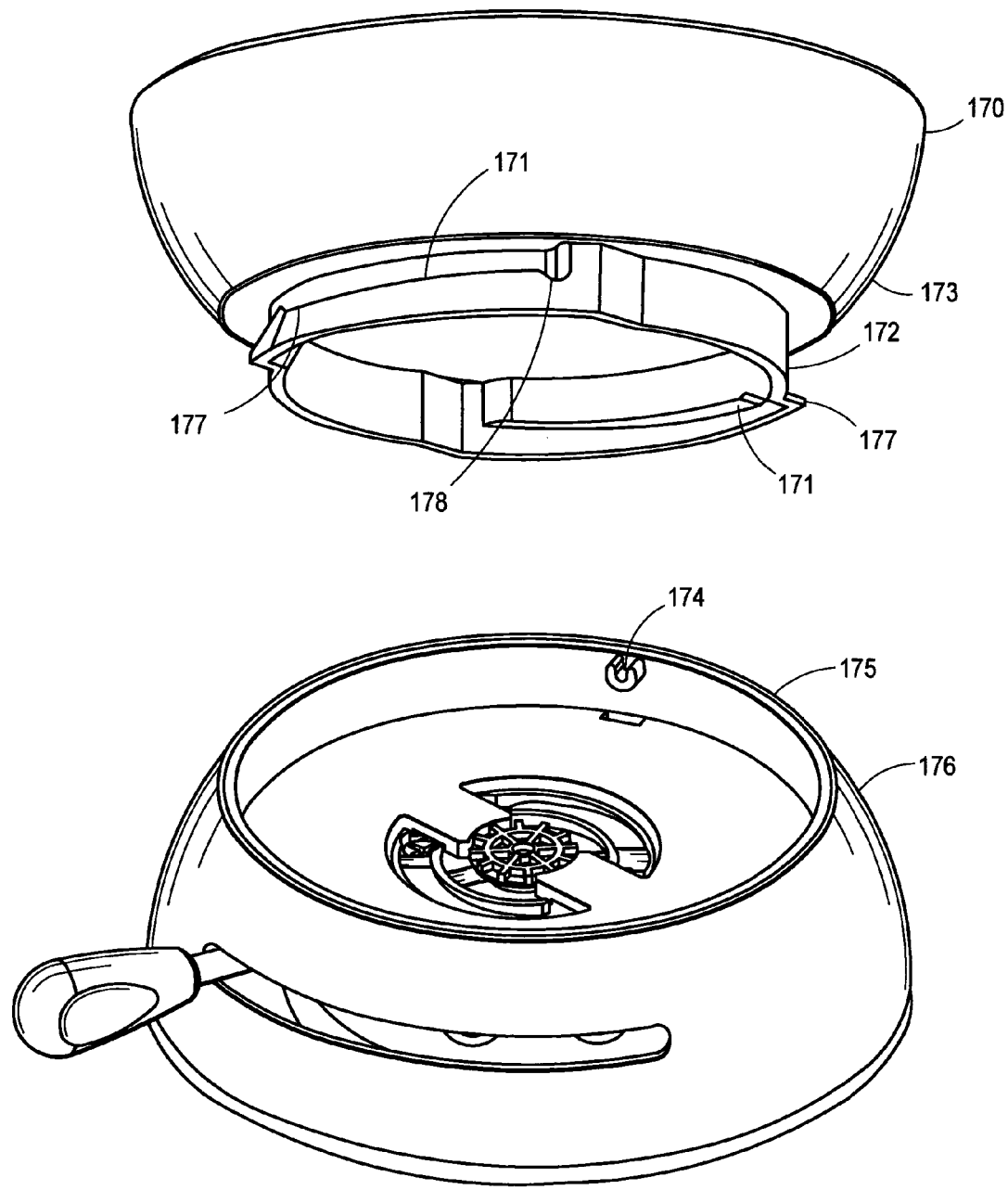
FIG. 19 is a perspective view of a bottom portion of a child's dish showing a preferred structure for removably attaching or securing the child's dish to a base containing a suction device.

FIGS. 18 and 19 show base embodiments and attachments that are preferred for use on the child's dish 115 and the salad spinner 130.

FIG. 18 shows a base attachment for a salad spinner 160 having a bottom portion 161 and a base 162 that houses a suction device. Pegs 163 extend from the outside of the base 162. Inside the bottom portion 161 of the salad spinner 160 are two ramped structures 164. The salad spinner 160 is secured to the base 162 by setting the bottom portion 161 on top of the base 162 such that the pegs 163 are positioned near the ends 165 of the ramped structures 164. Bumps 166 are formed on the upper surface of the ramps 164 at an end thereof opposite ends 165. The salad spinner 160 is rotated so that the pegs 163 move up the ramped structures 164, moving the base 162 and the bottom portion 161 of the salad spinner 160 toward one another and, as the rotation continues, securing the base 162 to the bottom portion of the salad spinner 160 when the pegs 163 are forced over bumps 166 so as to lock the salad spinner 160 and the base 162 together. The connection so achieved is similar to a threaded connection, but uses the pegs 163 and the ramped structures 164 in the place of threads configured to engage one another. Of course, the rotation of the salad spinner 160 in the opposite direction in relation to the base 162, causes the pegs 163 to move back over the bumps 166 and in the opposite direction on the ramped surfaces 164 and causes the salad spinner 160 and the base 162 to move away from one another such that they can be separated when the pegs 163 have moved off the ends 165 of the ramped structures 164.

FIG. 19 shows a base attachment for a child's dish 170. The base attachment shown is similar to the attachment of the salad spinner 160. In this child's dish 170, the ramped structures 171 are built into an extension 172 that extends from a bottom portion 173 of the child's dish 170. Pegs 174 extend from the inside of a rim 175 on a base 176 that contains a suction device. The child's dish 170 is set inside the rim 175 of the base 176 such that the pegs 174 are near the ends 177 of the ramped structures 171. The child's dish 170 is then rotated such that the pegs 174 slide on the ramps 171 and move the dish 170 and the base 176 toward each other until the pegs 174 are forced over bumps 178 formed on the surface of the ramps 171 at an end of the ramps 171 opposite the ends 177. In this manner, the dish 170 and the base 176 are secured to one another in a manner similar to that described with respect to the salad spinner 160 above. Again, this attachment is similar to a threaded connection. And, in a manner similar to the disengagement of the salad spinner 160 from its base 162, the child's dish 170 is removed from the base 176 by rotating the dish 170 in the opposite direction.

Although various embodiments of bases and base connections are specifically described above, bases of different shapes or configurations, as well as bases with different types of removable attachments, may be used on any of the above devices to suite the needs and desires of users and consumers. Moreover, the large variety of shapes and configurations of base that can house suction devices such as suction device 2 make it easy to design round, square, rectangular, or irregularly shaped bases that embody a multitude of novel, attractive styles and appearances to match kitchen décor, to match other kitchenware items, or to appeal to the different artistic and decorating tastes of consumers.

And, of course, the attachment assemblies described herein may be used, not only on kitchenware, but on all sorts of devices and implements that require attachment to a stand, base, or some other object or structure.

It is understood that while certain forms of this invention have been illustrated and described, it is not limited thereto except insofar as such limitations are included in the following claims and allowable functional equivalents thereof.

What is claimed is as follows:

1. A suction device securable to a mating surface by a partial vacuum, the suction device comprising:
   a plate having two extensions, each extension forming a sloped surface spaced apart from the plate;
   a suction pad mounted to the plate, the suction pad in contact with the mating surface;
   a handle slidable along both sloped surfaces; and
   a pivot positioned between the two extensions;
   wherein the suction device is secured to the mating surface by a partial vacuum when the handle slides along the sloped surfaces and pulls the plate away from the mating surface; and
   wherein the handle is in sliding contact with both sloped surfaces, the handle extending from one sloped surface to and through a hole in the pivot and to the other sloped surface.

2. The suction device of claim 1 wherein the suction device is housed in a chamber in a base, and the handle extends outward through a slot in the base.

3. The suction device of claim 1 wherein the plate has a side facing away from the mating surface and suction pad is mounted to the plate by at least one of placing the pad on the side and securing the pad to the side.

4. The suction device of claim 1 wherein a portion of the suction pad extends beyond an outer periphery of the plate and remains in contact with the mating surface when the handle slides along the sloped surface.

5. The suction device of claim 1 wherein, when the handle slides in an opposition direction along the sloped surfaces, the partial vacuum is dissipated.

6. The suction device of claim 1 wherein an indentation is formed in an end of at least one of the sloped surfaces such that, when the handle slides into the indentation, the handle is retained in place.

7. The suction device of claim 1 wherein the suction device is housed in a base, and the handle further extends from the other sloped surface out through a slot in the base.

8. A suction device securable to a mating surface by a partial vacuum, the suction device comprising:
   a suction pad mounted on a plate and in contact with the mating surface;
   at least two bridge-like structures extending outward from the plate, each having a sloped surface spaced apart from the plate;
   a handle that slides along the at least two sloped surfaces to pull the plate away from the mating surface and create the partial vacuum between the mating surface and at least one of the plate and the suction pad; and
   a pivot between the at least two bridge-like structures, the handle extending through a hole in the pivot and into sliding contact with the at least two sloped surfaces.

9. The suction device of claim 8, wherein a central portion of the suction pad is attached to the plate and an outer portion of the suction pad extends beyond the plate.

10. The suction device of claim 8, wherein a central portion of the suction pad rests upon a surface of the plate that faces away from the mating surface.

11. The suction device of claim 8, wherein, when the handle slides in an opposite direction along the at least two sloped surfaces, the partial vacuum is released.

12. The suction device of claim 8, wherein the suction device is housed in an internal chamber of a base and the handle further extends out through a slot in the base.

* * * * *